(12) United States Patent
Meidad

(10) Patent No.: US 12,296,977 B2
(45) Date of Patent: May 13, 2025

(54) DEVICE FOR REFUELING AIR VEHICLES

(71) Applicant: ISRAEL AEROSPACE INDUSTRIES LTD., Lod (IL)

(72) Inventor: Ido Meidad, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 17/925,427

(22) PCT Filed: May 13, 2021

(86) PCT No.: PCT/IL2021/050558
§ 371 (c)(1),
(2) Date: Nov. 15, 2022

(87) PCT Pub. No.: WO2021/234688
PCT Pub. Date: Nov. 25, 2021

(65) Prior Publication Data
US 2023/0182921 A1 Jun. 15, 2023

(30) Foreign Application Priority Data
May 20, 2020 (IL) .......................................... 274804

(51) Int. Cl.
*B64D 39/04* (2006.01)
*G05D 1/00* (2006.01)

(52) U.S. Cl.
CPC ........... *B64D 39/04* (2013.01); *G05D 1/0808* (2013.01)

(58) Field of Classification Search
CPC .......... B60F 3/0007; B60F 3/00; B63B 79/15; B63B 1/121; B63B 5/24; B63B 49/00;
(Continued)

(56) References Cited

U.S. PATENT DOCUMENTS 2,949,265 A * 8/1960 Person .................. B64D 39/04
244/135 A
3,067,972 A 12/1962 Mosher
(Continued)

FOREIGN PATENT DOCUMENTS

CN 105083571 A 11/2015
GB 676430 A 7/1952
(Continued)

OTHER PUBLICATIONS

International Search Report and Written Opinion mailed Jul. 22, 2021 received in PCT/IL2021/050558.

*Primary Examiner* — Benjamin P Lee
(74) *Attorney, Agent, or Firm* — Dorsey & Whitney LLP

(57) ABSTRACT

Examples of a refueling device for use in in-flight refueling operation are provided. In at least one example the refueling device includes a body, a boom member and a spatial control system. The body is configured for being towed by a tanker aircraft in a forward direction via a fuel hose at least during in-flight refueling operation, the body having a body longitudinal axis and a neutral point. The boom member is carried by the body. The boom member has a fuel delivery nozzle, the fuel delivery nozzle being configured for selectively engaging with a fuel receptacle in a receiver aircraft to enable fuel to be transferred from the fuel hose to the receiver aircraft during such in-flight refueling operation. The spatial control system is configured for selectively providing stability and control to the refueling device. At least during refueling operation the fuel delivery nozzle is longitudinally forward of the neutral point.

20 Claims, 6 Drawing Sheets

(58) Field of Classification Search
CPC .......... B63H 1/14; B63H 21/17; B63H 25/42; B64C 37/00; G05D 1/0016; G05D 1/0012
See application file for complete search history.

(56) References Cited

U.S. PATENT DOCUMENTS

| | | | |
|---|---|---|---|
| 7,562,847 B2 | 7/2009 | Jones | |
| 9,150,311 B2 * | 10/2015 | Rix | G05D 1/101 |
| 9,315,277 B2 * | 4/2016 | Foo | B64D 39/04 |
| 10,654,584 B2 * | 5/2020 | Bosma | B64U 10/60 |
| 11,273,926 B2 * | 3/2022 | Le Cadet | B64U 30/26 |
| 11,465,768 B2 * | 10/2022 | Meidad | B64C 39/024 |
| 11,745,894 B2 * | 9/2023 | Bosma | B64C 39/024 244/195 |
| 11,866,192 B2 * | 1/2024 | Budd | B64D 39/06 |
| 2013/0168498 A1 * | 7/2013 | Rix | B64D 39/06 244/135 A |
| 2014/0306063 A1 * | 10/2014 | Kusnitz | B64D 39/06 244/135 A |
| 2014/0346279 A1 * | 11/2014 | Foo | B64D 39/02 244/135 A |
| 2016/0075441 A1 * | 3/2016 | Elsawah | B64D 39/04 244/135 A |
| 2019/0359345 A1 | 11/2019 | Rix et al. | |
| 2020/0025498 A1 * | 1/2020 | Wheeler | F41A 21/325 |
| 2021/0147095 A1 * | 5/2021 | Meidad | B64C 39/024 |

FOREIGN PATENT DOCUMENTS

| | | | |
|---|---|---|---|
| GB | 2237251 A | 5/1991 | |
| KR | 20070042928 A | 4/2007 | |
| WO | 2013102903 A2 | 7/2013 | |
| WO | 2013102906 A2 | 7/2013 | |
| WO | WO-2013102903 A3 * | 2/2014 | ............... B64D 3/00 |
| WO | 2018235071 A1 | 12/2018 | |
| WO | 2019012523 A1 | 1/2019 | |

* cited by examiner

DEVICE FOR REFUELING AIR VEHICLES

TECHNOLOGICAL FIELD

The presently disclosed subject matter relates to in-flight refueling systems, in particulars to boom-type in-flight refueling systems.

BACKGROUND

Airborne refueling (also referred to interchangeably herein as air refueling, in-flight refueling, air to air refueling (AAR), aerial refueling, tanking, and the like) refers to the process of transferring fuel from a tanker aircraft to a receiver aircraft during flight.

Two types of airborne refueling systems are currently in use for refueling airborne military aircraft:
the so-called "hose and drogue" system, used by the US Navy and many non-US air forces;
the so-called "boom and receptacle" or "flying boom" system, used by the US Air Force, and also used by Israel, Turkey and the Netherlands.

In the hose and drogue system, the refueling aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker. The pilot of the receiver aircraft controls the flight path thereof to ensure engaging contact between the probe and the receptacle. Thereafter, the receiver aircraft is refueled via the refueling line and probe.

In the boom and receptacle system, the tanker includes a so-called "flying boom", which is a rigid tube that telescopes outwardly and is gimbaled to the rear of the tanker aircraft, and is otherwise retracted into the tanker fuselage when not in use. The boom carries a fuel line and comprises a fuel transfer nozzle at the end thereof, and the boom is equipped with adjustable flight control surfaces. Once the tanker and receiver aircraft are in close proximity and flying in formation, with the receiver aircraft at a position behind the tanker within an air refueling envelope (i.e., safe limits of travel for the boom with respect to the receiver aircraft and within which contact between the receiving aircraft and the boom is safe), a dedicated operator in the tanker controls the position of the boom via the control surfaces, and inserts the end of the boom including the nozzle into a receptacle provided on an upper part of the receiving aircraft, ensuring proper mating between the nozzle and receptacle, after which fuel transfer can begin. During refueling, and while the boom is engaged with the receptacle, the pilot of the receiver aircraft must continue to fly within the air refueling envelope, and if the receiver aircraft approaches these limits the operator in the tanker requires the receiver aircraft pilot to correct the position thereof, and if necessary the boom is disconnected to prevent accidents. All current tankers of this type carry a single boom and can refuel a single receiver aircraft of this type at a time.

In addition, there are some tankers that comprise a flying boom system and at least one hose and drogue system as well, and are commonly known as Multi-Point Refueling Systems (MPRS). In some cases a hose and drogue system is provided at the aircraft tail, and thus only this system or the flying boom system may be used at any one time. In other cases, two under-wing hose and drogue pods, known as Wing Air Refueling Pods (WARPs), can be provided, one under each wing, in addition to the flying boom system.

By way of general background, WO 2013/102903 and WO 2013/102906, assigned to the present Assignee, disclose a variety of refueling devices, systems and methods for use in in-flight refueling. In one example one such device is towed by a tanker aircraft via a fuel hose at least during in-flight refueling, and has a boom member with a boom axis. The boom member enables fuel to be transferred from the fuel hose to a receiver aircraft along the boom axis during in-flight refueling. The device maintains a desired non-zero angular disposition between the boom axis and a forward direction at least when the refueling device is towed by the tanker aircraft in the forward direction via the fuel hose.

Also by way of general background, U.S. Pat. No. 7,562,847 discloses an autonomous in-flight refueling hose end unit including a first end configured to be coupled to a fuel hose of a tanker aircraft, and a second end configured to be coupled to receiver aircraft and adjustable control surfaces, and a flight control computer autonomously controls the control surfaces to fly the refueling hose end into contact with the receiver aircraft.

Also by way of general background, in GB 2,237,251 an in flight refueling apparatus mountable on a tanker aircraft has a probe receptor coupled with a fuel line and is arranged to be deployed outboard of the aircraft, and can be provided on a drogue or a boom. In one mode, the apparatus is arranged to provide a parameter which is representative of the deviation of the path of the receptor from a predetermined initial path for actuating control means for changing automatically the position of the receptor relative to the initial path. In another mode, a parameter which is representative of the relative angular position of the receptor with respect to the probe of an approaching refueling aircraft for actuating control means for changing automatically the relative angular position to achieve alignment of receptor and probe.

Acknowledgement of the above references herein is not to be inferred as meaning that these are in any way relevant to the patentability of the presently disclosed subject matter.

GENERAL DESCRIPTION

According to a first aspect of the presently disclosed subject matter there is provided a refueling device for use in in-flight refueling operation, comprising:
(a) a body configured for being towed by a tanker aircraft in a forward direction via a fuel hose at least during in-flight refueling operation, the body having a body longitudinal axis and a neutral point;
(b) a boom member carried by the body, the boom member having a fuel delivery nozzle, the fuel delivery nozzle being configured for selectively engaging with a fuel receptacle in a receiver aircraft to enable fuel to be transferred from said fuel hose to the receiver aircraft (for example along a boom axis, for example along an aft boom axis) during said in-flight refueling operation;
(c) spatial control system configured for selectively providing stability and control to the refueling device;
(d) wherein at least during refueling operation the fuel delivery nozzle (or the nozzle rotation center of the fuel delivery nozzle) is longitudinally forward of the neutral point.

According to the aforesaid first aspect of the presently disclosed subject matter there is also provided a refueling device for use in in-flight refueling operation between a tanker aircraft and a receiver aircraft, comprising:

a selectively steerable body configured for being towed by a tanker aircraft via a fuel hose at least during in-flight refueling, and comprising a boom member having an aft boom axis and a fuel delivery nozzle, said boom member configured to enable fuel to be transferred from said fuel hose to a receiver aircraft along said aft boom axis during said in-flight refueling operation;

wherein at least during said in-flight refueling operation the fuel delivery nozzle (or the nozzle rotation center of the fuel delivery nozzle) is longitudinally forward of a neutral point of the refueling device.

For example, device comprises a spatial control system configured for selectively providing stability and control to the refueling device, thereby enabling selectively steering the body.

According to the aforesaid first aspect of the presently disclosed subject matter there is also provided a boom member for a refueling device for use in in-flight refueling operation, the boom member comprising a forward boom member portion having a forward boom axis, and an aft boom member portion having an aft boom axis, the forward boom member portion being connected to the aft boom member portion via a boom elbow portion wherein the forward boom axis is angularly displaced with respect to the aft boom axis by a non-parallel angular disposition. For example, said angular disposition is between 60° and 120°, for example between 60° and 120°, for example between 70° and 110°, for example between 80° and 100°, for example between 85° and 100°, for example between 90° and 100°, for example between 95° and 105°, for example between 90° and 110°.

Each of the above implementations according to the aforesaid first aspect of the presently disclosed subject matter can include one or more features, for example as follows:

For example, the fuel delivery nozzle is rotatably mounted to a free end of the boom member via a nozzle rotation center of the fuel delivery nozzle, and at least during refueling operation the nozzle rotation center is longitudinally forward of the neutral point.

Additionally or alternatively, for example, the boom member comprising a forward boom member portion having a forward boom axis, and an aft boom member portion having an aft boom axis. For example, the boom member is mounted to the body via the forward boom member portion, and wherein the fuel delivery nozzle is located on said aft boom member.

Additionally or alternatively, for example, in at least one example, the boom member is pivotably mounted to the body via the forward boom member portion. Additionally or alternatively, for example, said boom member is pivotably mounted with respect to the body.

Additionally or alternatively, for example, said boom member is pivotable with respect to the body between a retracted position and a deployed position. For example, in said deployed position the fuel delivery nozzle is configured to enable in-flight refueling. Additionally or alternatively, for example, in said deployed position the fuel delivery nozzle is at a transverse spacing with respect to the body to enable in-flight refueling. Additionally or alternatively, for example, in said retracted position the fuel delivery nozzle is located closer with respect to the body than in the deployed position.

Additionally or alternatively, for example, said forward boom member portion is connected to said aft boom member portion via a boom elbow.

Additionally or alternatively, for example, the forward boom axis and the aft boom axis are in non-parallel spatial relationship.

Additionally or alternatively, for example, the forward boom axis and the aft boom axis are in a fixed non-parallel spatial relationship irrespective of whether the boom member is in the retracted position or the deployed position.

Additionally or alternatively, for example, the forward boom axis is angularly displaced with respect to the aft boom axis by a first angular disposition. For example, said first angular disposition is between 60° and 120°, for example between 60° and 120°, for example between 70° and 110°, for example between 80° and 100°, for example between 85° and 100°, for example between 90° and 100°, for example between 95° and 105°, for example between 90° and 110°.

Additionally or alternatively, for example, said boom member is in said deployed position during said in-flight refueling operation.

Additionally or alternatively, for example, at least during said in-flight refueling operation, said aft boom axis is at a second angular disposition with respect to said body longitudinal axis, said second angular disposition being non-zero.

Additionally or alternatively, for example, said boom member pivots as a rigid body.

Additionally or alternatively, for example, in at least one other example, the boom member is fixedly mounted to the body via the forward boom member portion. For example, the forward boom member portion is in the form of a fin or is accommodated in a fin.

Additionally or alternatively, for example, at least during said in-flight refueling operation, said aft boom axis is at a third angular disposition with respect to a forward direction of said refueling device. For example, said third angular disposition is such as to ensure that the aft boom axis is at a predetermined design angle with respect to the receiver aircraft. For example, said design angle is about 30°. Additionally or alternatively, for example, said refueling device is configured for maintaining said third angular disposition between said aft boom axis and said forward direction at least prior to engagement of said fuel delivery nozzle with a fuel receptacle of a receiver aircraft that is flying in formation aft of the tanker aircraft.

Additionally or alternatively, for example, said spatial control system is further configured for selectively providing control moments in at least one of pitch, yaw and roll wherein to enable the refueling device to be flown while towed by the tanker aircraft in said forward direction via said fuel hose.

Additionally or alternatively, for example, said spatial control system comprises selectively controllable aerodynamic control system. For example, said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces. For example, said forward set of aerodynamic control surfaces comprises a canard configuration, and said aft set of aerodynamic control surfaces comprises one or more wing elements. Additionally or alternatively, for example, said aft set of aerodynamic control surfaces comprises an H-wing configuration, comprising two vertical wing stabilizers, one each on either side of a respective wing. Additionally or alternatively, for example, said forward set of aerodynamic control surfaces comprises an H-canard configuration, comprising two vertical canard stabilizers, one each on either side of a respective canard.

Additionally or alternatively, for example, said spatial control system is configured for enabling the refueling device to be steered in one, or two, or three degrees of freedom in translation, and in one, or two, or three degrees of freedom in rotation, independently of the tanker aircraft or of the refueling aircraft.

Additionally or alternatively, for example, the refueling device further comprises an aerodynamic stabilizer arrangement, different from the spatial control system. For example, said aerodynamic stabilizer arrangement is in the form of a drogue structure having a stowed configuration, in which drogue structure generates a minimum drag, and a deployed configuration in drogue structure generates greater drag than in the inactive configuration.

Additionally or alternatively, for example, the refueling device further comprises a force generating arrangement configured for selectively generating a force along said aft boom axis in a direction towards said fuel delivery nozzle. For example, said force generating arrangement is configured for selectively generating said force along said aft boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle.

Additionally or alternatively, for example, said body comprises a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication.

Additionally or alternatively, for example, the refueling device further comprises a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft.

Additionally or alternatively, for example, the refueling device further comprises a suitable controller for controlling operation thereof.

According to a second aspect of the presently disclosed subject matter there is provided a refueling system comprising a refueling fuel reservoir connected to a refueling device via a hose, the refueling device being as defined herein with respect to the first aspect of the presently disclosed subject matter.

According to a third aspect of the presently disclosed subject matter there is provided a tanker aircraft comprising at least one refueling system as defined herein with respect to the second aspect of the presently disclosed subject matter.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Referring to FIGS. 1 to 4, a refueling device for use in in-flight refueling operation, according to one example of the presently disclosed subject matter, generally designated 100, comprises a body 110, a boom member 130, and a spatial control system 160.

Figure 5:
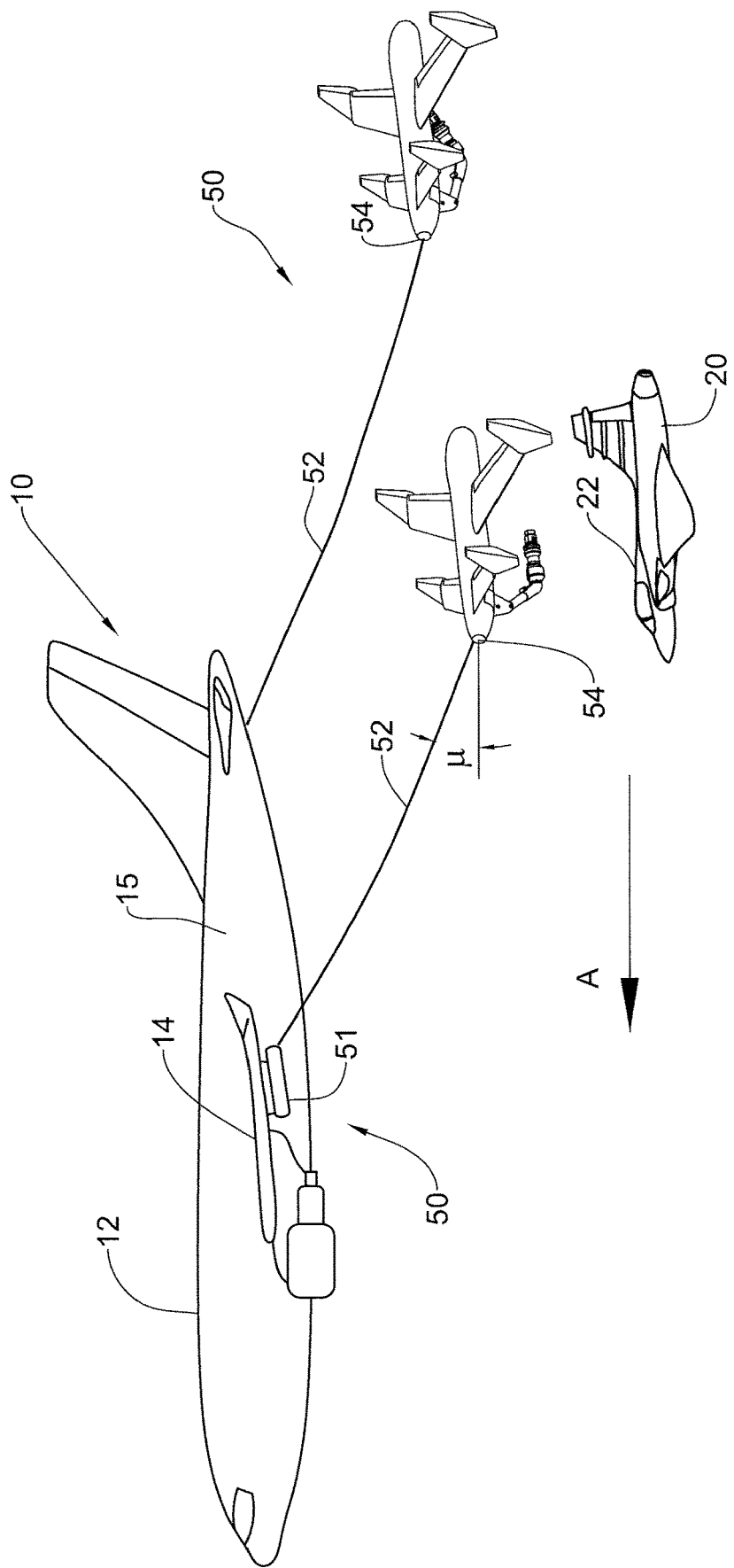
FIG. 5 is a side view of a tanker system according to an example of the presently disclosed subject matter.

As will become clearer herein, and referring also to FIG. 5, the refueling device 100, and in particular the body 110 is configured for being towed by a tanker aircraft 12 in a forward direction A via a fuel hose 52 at least during in-flight refueling operation, the body 110 having a body longitudinal axis LAB and a neutral point NP.

As is well known in the art the neutral point of an air vehicle is the position at which the center of gravity needs to be located to provide the aircraft with neutral stability. In practice conventionally, the center of gravity of many conventional air vehicles is often not located at the neutral point, and the distance between the two is referred to as the static margin. The static margin is "positive" if the center of gravity is located forward of the neutral point, providing the aircraft with positive stability, or "negative" if the center of gravity is located aft of the neutral point, providing the aircraft with negative stability. As will become clearer herein, the device 100 is configured with positive stability, and the neutral point NP thereof is located aft of the center of gravity CG.

Figures 6, 6A, 6B:
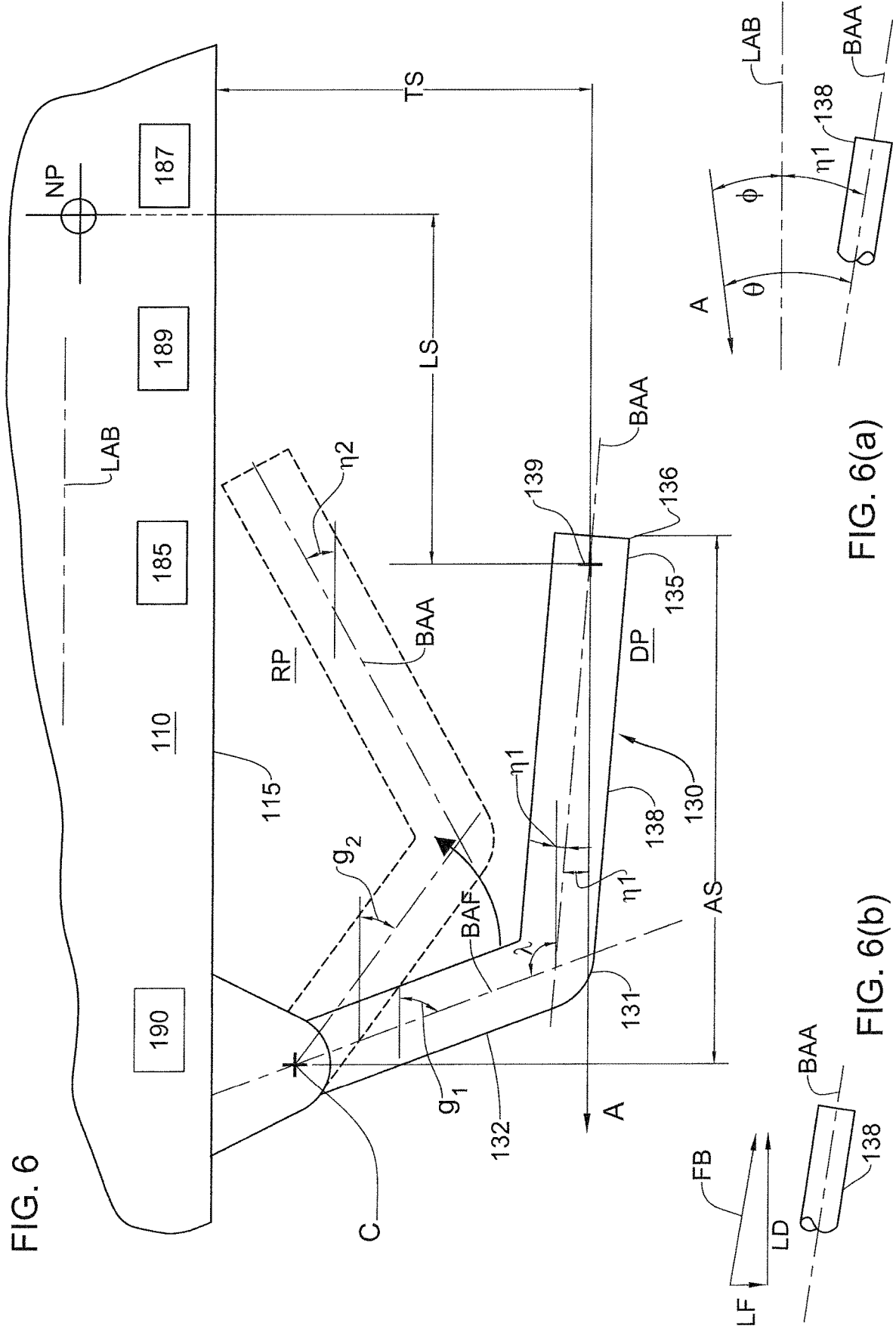
FIG. 6 is a detail side view of part of the refueling device of the example of FIG. 1.
FIG. 6(a) schematically illustrates an example of the spatial relationship between the aft boom axis, body longitudinal axis and forward direction of the example of FIG. 6.
FIG. 6(b) schematically illustrates an example of the spatial relationship between the aft boom axis, and a selectively generated force on the boom regarding the example of FIG. 6.

Furthermore, the boom member 130 is carried by the body 110, the boom member 130 having a fuel delivery nozzle 135, the fuel delivery nozzle 135 being configured for selectively engaging with a fuel receptacle in a receiver aircraft 20 to enable fuel to be transferred from the fuel hose 52 to the receiver aircraft 20 along during the in-flight refueling operation. Furthermore, the spatial control system 160 is configured for selectively providing stability and control to the refueling device 100, in particular prior to engagement of the refueling device 100 with the receiver aircraft 20. Conventionally, the fuel delivery nozzle 135 is mounted at the free end of the boom member 130 via a ball joint or the like, for example a flexible ball joint, allowing relative rotation between the fuel delivery nozzle 135 and the free end of the boom member 130 in pitch and/or yaw, and in some cases in pitch and/or yaw and/or roll. The center of such rotation is referred to herein as the nozzle rotation center, and generally designated with the reference numeral 139 (FIG. 6).

According to an aspect of the presently disclosed subject matter, and will become clearer herein, at least during refueling operation the fuel delivery nozzle 135, in particular the nozzle rotation center 139 of the fuel delivery nozzle 135, is longitudinally forward of the neutral point NP by longitudinal spacing LS.

Referring in particular to FIG. 5, a tanker system 10, according to one example of the presently disclosed subject matter, comprises the tanker aircraft 12 including one or more in-flight refueling systems 50. As will become clearer herein, each refueling system 50 comprises a refueling device 100.

In at least this example, the tanker aircraft 12 has three such in-flight refueling systems 50, one in-flight refueling system 50 carried by the port wing 14, another in-flight refueling system 50 carried by the starboard wing 16, and a third in-flight refueling system 50 located in the rear portion of the fuselage 15, and the tanker aircraft 12 is configured for in-flight concurrent refueling of up to three receiver aircraft 20. In alternative variations of this example the tanker aircraft 12 can have at least one, or two, or more than three in-flight refueling systems 50, arranged in any suitable configuration with respect to the tanker aircraft 12.

By way of non-limiting example, such a tanker aircraft 12 can be a suitably equipped Boeing 767, Boeing 747, or Airbus A330, and each receiver aircraft 20 can include any suitable aircraft, for example any one of suitably equipped F-15, or F-16, or F-35, or B1, or B2 stealth bomber, or other suitably equipped fighter, bomber or other aircraft. Alternatively, and also by way of non-limiting example, the tanker aircraft can be an unmanned aerial vehicle (UAV), and/or at least one of the receiver aircraft can be a UAV.

Also by way of non-limiting example, a refueling flight envelope for use with such a tanker system 10 can include a forward speed of between about 220 knots and about 320 knots (typically about 280 knots), and an altitude of between 500 ft and between about 30,000 ft to about 40,000 ft, and in general typically not below about 10,000 ft, in which refueling can take place between the tanker aircraft 12 and each receiver aircraft 20, flying in formation, depending on the operating limits of the tanker aircraft and of the receiver aircraft, as well as other factors.

In at least this example, each in-flight refueling system 50 comprises an elongate, non-rigid, fuel delivery hose 52, reversibly extendible from the tanker aircraft 12. A first end (not shown) of the hose 52 is connected to a refueling fuel tank (not shown) carried by the tanker aircraft 12. For example, such a refueling fuel tank can be an internal fuel tank of the tanker aircraft 12, for example the tanker aircraft's own fuel tanks, or a special fuel reservoir mounted internally in the tanker aircraft 12, for example in the fuselage, or externally and carried in fuel pods, for example.

The hose 52 is flexible and can be retracted into a roll up drum (not shown), suitably provided in the tanker aircraft 12, and selectively deployed therefrom when required.

The second (aft) end 54 of hose 52 is operatively connected to a respective refueling device 100 that is towed in a forward direction A by the tanker aircraft 12 via hose 52 when the hose 52 is extended and the tanker aircraft 12 is in flight.

In this example, one in-flight refueling system 50 is centrally-located and mounted with respect to the rear fuselage of the tanker aircraft 12, and each of the other two in-flight refueling systems 50 is comprised in a respective pod 51 that is attached to the underside of the respective wing.

Thus, and referring again to FIGS. 1 to 4, the refueling device according to a first example of the presently disclosed subject matter, generally designated 100, is configured for use with respect to an in-flight refueling system, for example at least one of the in-flight refueling systems 50 of the example of the tanker system 10 illustrated FIG. 5.

For convenience, and referring again to FIGS. 1 to 4, a roll axis R, a pitch axis P and a yaw axis Y can be conventionally defined with respect to the refueling device 100. The roll axis R is parallel to or co-axial with the longitudinal axis LAB of the device 100; the pitch axis P is generally in lateral and orthogonal relationship to the roll axis R (i.e., parallel to the horizontal when the body is at a zero roll angle); and yaw axis Y is in orthogonal relationship to the roll axis R the pitch axis P (i.e., parallel to the vertical when the body is at a zero pitch angle).

Refueling device 100 is affixed to the end 54 of hose 52 and comprises body 110, which at least in this example is in the form of a generally elongate fuselage, and comprises a longitudinal axis LAB. While in at least this example the body 110 comprises a general oval or elliptical cross section, in alternative variations of this example the body 110 can have any other suitable cross-sectional shape, for example circular cross-section, polygonal cross-section, super-elliptical cross-section, and so on.

Figure 3:
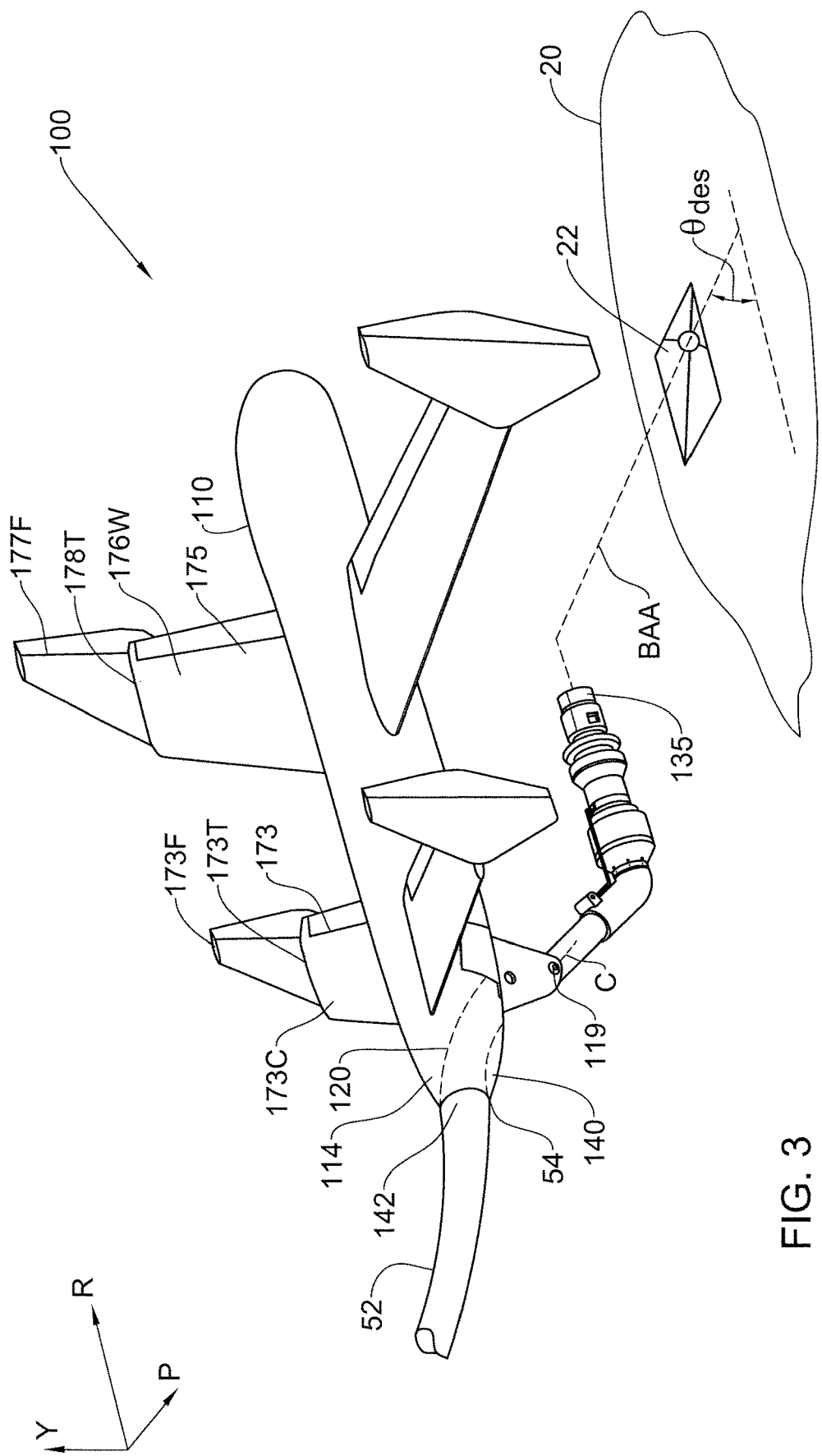
FIG. 3 is an isometric view of the example of the refueling device of FIG. 1, with the boom member in the deployed position.
Figure 4:
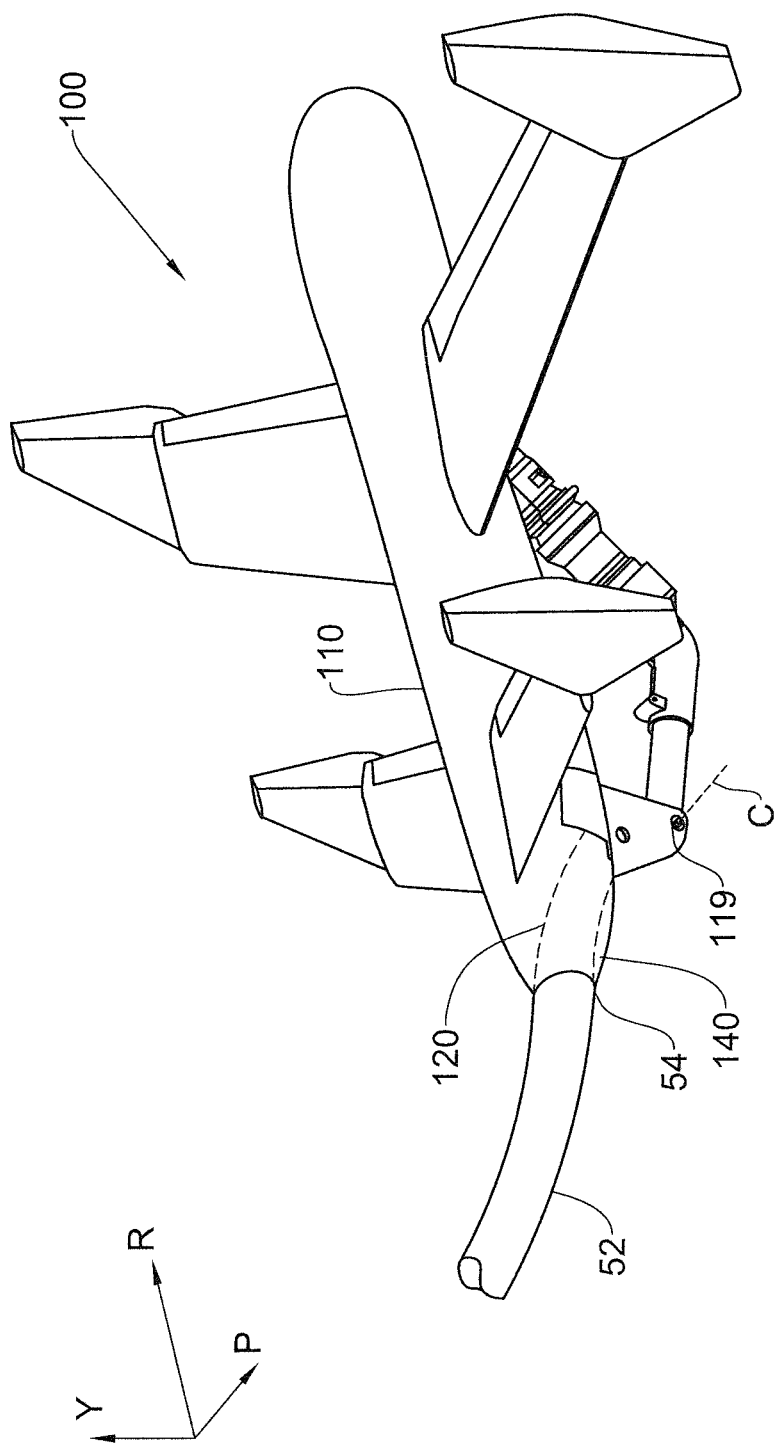
FIG. 4 is an isometric view of the example of the refueling device of FIG. 1, with the boom member in the retracted position.

Referring in particular to FIGS. 3 and 4, the body 110 comprises a fuel delivery lumen 120 and carries boom member 130 (which at least in this example is a substantially rigid boom member) in fluid communication with fuel delivery lumen 120. The boom member 130 comprises fuel delivery nozzle 135 at a terminus 136 i.e., at the aft end of the boom member 130. The nozzle 135 is configured for reversibly engaging with the fuel receptacle 22 of a receiver aircraft 20 (see also FIG. 5), and thus can comprise any conventional design of such nozzles, which are well known in the art, or indeed can comprise any other current or future design of such an in-flight refueling nozzle.

In at least this example, the boom member 130 has a fixed axial length AS (FIG. 6), at least in the deployed position DP, and is thus not extensible, providing for a relatively simple construction.

However, in alternative variations of this example, the boom member 130 can instead comprise a plurality of telescopic elements. For example, boom member 130 or part thereof can be telescopically mounted to body 110, and is reversibly extendable from a stowed position (in which most of the boom member is accommodated in a sleeve within the body 110), to a fully extended position for enablement of in-flight refueling, by means of a controllable actuation mechanism. Optionally such a boom member can be telescopically extendable to a controllably variable extended position in a general aft direction up to the aforesaid the fully extended position.

Referring in particular to FIG. 3, the body 110 comprises a coupling 140 at forward end 114 thereof. The coupling 140 comprises a hose interface 142 configured for connecting the lumen 120 to the hose 52, and thereby to the tanker aircraft 12. The coupling 140 can be configured for allowing relative rotation between the body 110 and the hose 52 while maintaining fluid communication between the lumen 120 and the hose 52 and thus the refueling tank. In this example, the coupling 140 is in the form of a universal joint or the like (also referred to as a universal coupling, a Cardan joint, a Hardy-Spicer joint or a Hooke's joint, and so on), and is thus configured for allowing relative rotation between the body 110 and the hose 52 in three degrees of freedom.

In alternative variations of this example and in other examples, the coupling can instead be configured for allowing relative rotation between the body 110 and the hose 52 only in one degree of freedom, or only in two degrees of freedom.

In particular, the coupling allows the body 110, and in particular the boom member 130 to freely pivot with respect to the hose 52, in particular the second end 54, about at least one axis (and typically about two or three (mutually orthogonal) axes), so that the spatial orientation of the refueling device 100 can be controllably changed without significant mechanical resistance thereto being generated by the hose 52 such an axis, which is typically parallel the pitch axis P of the refueling device 100, but may be alternatively inclined to the pitch axis P and/or to the roll axis R and/or to the yaw axis Y. For example, the second end 54 can comprise a ball joint or the like, for example a flexible ball joint, or a flexible joint, to allow free pivoting between the body 110 and the hose 52 (and in particular between the boom member 130 and the hose 52), about the aforesaid one, two or three axes.

In alternative variations of this example the coupling 140 can be omitted and replaced with a fixed coupling that is configured to maintain a fixed relative spatial disposition between the body 110 and the hose 52 (in particular between the body 110 and the second end 54) while maintaining fluid communication between the lumen 120 and the hose 52. For example such a spatial disposition can be an angle μ (see FIG. 5) of about 0°; or about 30°; or in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°. The boom member 130 is pivotably mounted to body 110 about axis C (generally parallel to the pitch axis P of the body 110) at pivot joint 119, and is reversibly pivotable between a stowed or retracted position RP (FIG. 4) and a deployed position DP (FIG. 3). The boom member 130 is typically in the retracted position RP during flight operations excluding actual in-flight operations to reduce drag, while during in-flight refueling operation the boom member 130 is in the deployed position DP.

Figure 1:
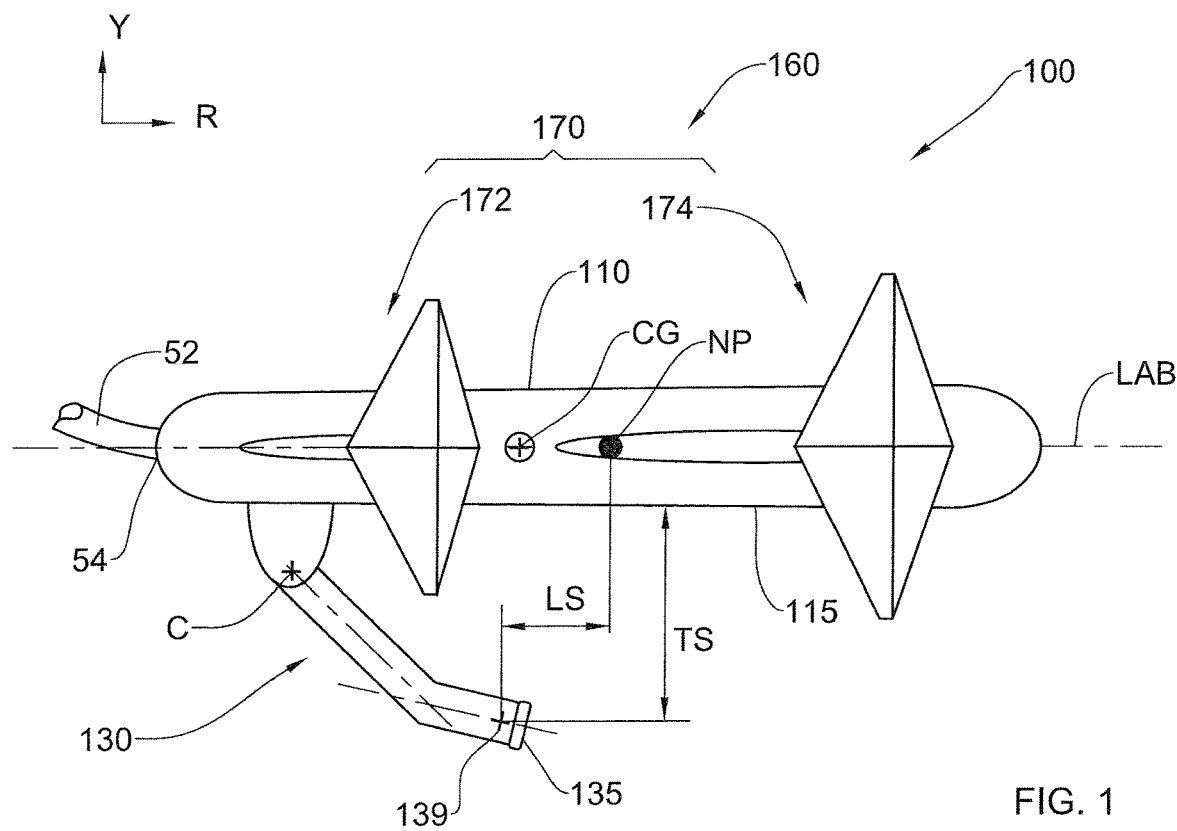
FIG. 1 is a side view of a refueling device according to of an example of the presently disclosed subject matter.

According to an aspect of the presently disclosed subject matter, and as mentioned above, at least during refueling operation the fuel delivery nozzle 135, in particular nozzle rotation center 139, is longitudinally forward of the neutral point NP by longitudinal spacing LS (FIG. 1).

Without being bound to theory, the inventor considers that having the fuel delivery nozzle 135, in particular nozzle rotation center 139, forward of the neutral point NP provides a measure of inherent stability to the refueling device 100, in particular the body 110, when the refueling device 100 is coupled to, i.e., engaged with, the receiver aircraft 20 via the boom member 130 and fuel delivery nozzle 135. The inventor further considers that in such an engaged configuration the spatial control system 160 is not particularly effective in providing stability and control moments to the refueling device 100, in particular the body 110, since the boom member 130 is then mechanically constrained at both ends—at the fuel delivery nozzle 135 (in particular at the nozzle rotation center 139) by being engaged to the receiver aircraft 20, and at the opposite end at the body 110. The inventor further considers that the refueling device 100, when flying freely and not engaged with the receiver aircraft 20, can rotate in pitch yaw and roll about a center that is associated with, and located at, the second end 54 of hose 52. The inventor further considers that the refueling device 100, when flying in engaged configuration with the receiver aircraft 20, the center of rotation for the refueling device 100, in pitch yaw and roll, moves to nozzle rotation center 139, and thus by having the neutral point NP aft of the fuel delivery nozzle 135, in particular aft of the nozzle rotation center 139, can provide inherent stability to the refueling device 100, in particular the body 110, particular when engaged with the receiver aircraft 20.

The inventor further considers that in such an engaged configuration such inherent stability is greater as the spacing is increased in the aft direction between the neutral point NP and the fuel delivery nozzle 135, in particular as the spacing is increased in the aft direction between the neutral point NP and the nozzle rotation center 139.

It is also to be noted that in practice, the fuel delivery nozzle 135 (and thus the nozzle rotation center 139) can be configured such as to be spaced below the underside 115 of the body 110 by a transverse spacing TS to provide sufficient clearance with respect to the receiver aircraft 20, and thereby minimize risk of collision between the receiver aircraft 20 and the body 110. The transverse spacing TS can also provide sufficient clearance with respect to the receiver aircraft 20, such as to decouple potential aerodynamic interactions between the spatial control system 160 and the receiver aircraft 20.

In at least this example, and referring to FIG. 1 and FIG. 6 in particular, the positioning of the fuel delivery nozzle 135 (in particular the position of the nozzle rotation center 139) longitudinally forward of the neutral point NP by longitudinal spacing LS, while concurrently maintaining the fuel delivery nozzle 135 in spaced relationship below the underside 115 of the body 110 by a transverse spacing TS or greater, is accomplished by configuring the boom member 130 as an elbowed boom as opposed to a rectilinear boom having a single rectilinear boom axis therethrough. Thus, in at least this example, the boom member 130 is configured with a forward boom member portion 132 having a forward boom axis BAF, and an aft boom member portion 138 having an aft boom axis BAA, joined at a boom elbow 131, wherein the forward boom axis BAF and the aft boom axis BAA are a non-parallel angular disposition λ with respect to one another, at least in the deployed position DP. By "non-parallel angular disposition λ" is meant that the forward boom axis BAF and the aft boom axis BAA can be at any desired angle with respect to one another other than at 0° or at 180° with respect to one another.

While in at least this example, the forward boom member portion 132 and the aft boom member portion 138 are each configured as rectilinear, rigid and generally tubular components, in alternative variations of this example, the forward boom member portion 132 can be configured as a non-rectilinear and/or non-rigid and/or non-tubular component, and/or, the aft boom member portion 138 can be configured as a non-rectilinear component. For example, in such alternative variations of this example, the forward boom member portion 132 can be configured as a flexible hose connected to the aft boom member portion 138 for example via a variable angle coupling, for example similar to coupling 140 as disclosed herein, mutatis mutandis.

The boom member 130 is mounted to the body 110 via the forward boom member portion 132, and the fuel delivery nozzle 135 (including the nozzle rotation center 139) is located on the aft boom member portion 138, at terminus 136.

The boom member 130 is thus configured as a non-rectilinear boom, in particular as a boom member having elbow 131, joining the forward boom member portion 132 to the aft boom member portion 138 to provide an elbow angle corresponding to the non-parallel angular disposition λ between the forward boom axis BAF, and the aft boom axis BAA (defined on a plane orthogonal to the pivot axis B, typically a plane parallel to the plane including the yaw axis Y and the roll axis R).

In at least this example, the boom member 130 is configured as a rigid member, wherein the non-parallel angular disposition λ is conserved for all pivot angles about pivot axis B, at least between the retracted position RP and the deployed position DP. In other words, at least between the retracted position RP and the deployed position DP the boom member 130 behaves as a rigid body.

In at least the deployed position DP, the non-parallel angular disposition λ is between 60° and 120°, for example between 60° and 120°, for example between 70° and 110°, for example between 80° and 100°, for example between 85° and 100°, for example between 90° and 100°, for example between 95° and 105°, for example between 90° and However, in alternative variations of this example, and in other examples, the boom member 130 is configured as a semi-rigid member, in particular as an articulated member wherein the angular disposition λ is conserved at a non-parallel angular disposition at the deployed position DP, but can vary in value at pivot angles about pivot axis B, at least between the retracted position RP and the deployed position DP. For example, in the retracted position RP the angular disposition λ can be 180° or close thereto, while in the deployed position DP the angular disposition λ can be, for example, between 60° and 120°.

In at least this example, the boom member 130 is pivotably mounted to the body 110 via the forward boom member portion 132, at hinge axis C. Thus, and referring in particular to FIG. 6, the boom member 130 is pivotable between a retracted position RP and a deployed position DP (shown in phantom lines in FIG. 6), wherein in the retracted position RP the fuel delivery nozzle 135 is located closer with respect to the body 110 in the deployed position DP.

In at least this example, in the retracted position RP the whole of the boom member 130, in particular the aft boom member portion 138 including the fuel delivery nozzle 135 and nozzle rotation center 139 is located outside of the body 110. However, in alternative variations of this example, and in other examples, in the retracted position RP the whole of the boom member 130, or part thereof, for example the aft boom member portion 138 and/or the fuel delivery nozzle 135 can be located inside the body 110, for example in a recess provided therein.

Furthermore, in at least this example, in the deployed position DP the aft boom axis BBA is at a first angular disposition η1 with respect to the body longitudinal axis LAB, while in the retracted position RP the aft boom axis BBA is at a second angular disposition η2 with respect to the body longitudinal axis LAB, wherein the first angular disposition η1 is different from the second angular disposition η2.

It is further to be noted that at least in this example, in the deployed position DP the forward boom axis BAF is at a first angular disposition g1 with respect to the body longitudinal axis LAB, whereas in the retracted position RP the forward boom axis BAF is at a second angular disposition g2 with respect to the body longitudinal axis LAB, wherein the first angular deposition g1 is greater than the second angular disposition g2. For example, the first angular disposition g1 can be in the range 0° to about 90°, or in the range 80° to about 90°, or in the range 70° to about 90°, or in the range 60° to about 90°, or in the range 50° to about 90°, or in the range 45° to about 90°, or in the range 40° to about 90°. On the other hand, for example, the second angular disposition g2 can be in the range 0° to about 50°, or in the range 0° to about 45°, or in the range 0° to about 40°, or in the range 0° to about 30°, or in the range 0° to about 20°, or in the range 0° to about 10°, or in the range 0° to about 5°.

Thus, in the stowed or retracted position RP, boom member 130 is pivoted about axis C into a position where the terminus 136 is closest to the underside 115 of body 110. In this position, the aft boom portion 138 is in proximity to the underside 115 of body 110. In the deployed position DP, boom member 130 is variably pivoted about pivot axis C in a downward direction to provide a non-zero angular displacement, i.e., first angular disposition η1, between aft boom axis BAA and body longitudinal axis LAB. In this example, first angular disposition η1 is an angle in pitch with respect to the refueling device 100.

In any case, in general the boom member 130 is in the deployed position DP at least during in-flight refueling operation of the device 100.

An actuation mechanism 190 is provided for controllably pivoting the boom member 130 between the stowed or retracted position RP and the deployed position DP. Actuation mechanism 190 can include, for example, an articulated strut comprising an upper strut connected to a lower strut at a pivoting joint. The upper strut can be pivotably connected to an underside 115 of body 110, while the lower strut can be pivotably connected to an upper side of boom member 130. An actuator (not shown) operates to selectively and effectively bring close or distance away the pivoting joint with respect to the body. The actuator or the actuation mechanism 190 can be configured to selectively lock the articulated strut only at each one of the stowed/retracted position RP and the deployed position DP, to provide a respective fixed angle for the first angular disposition η1 and/or the second angular disposition η2; alternatively, the actuator or the actuation mechanism 190 can be configured to selectively lock the articulated strut at each one of the stowed/retracted position and the deployed position, and at any angular disposition therebetween.

Other alternative configurations for actuation mechanism 190 are of course possible.

Angular components in yaw and/or roll can be provided to the aft boom axis BAA with respect to the forward direction A for example by suitably orienting the device 100 with respect to the yaw axis Y and/or roll axis R, respectively.

The refueling device 100, in particular the boom member 130, nozzle 135 and lumen 120 can be sized to allow suitable fuel flow rates for refueling a wide range of receiver aircraft. By way of non-limiting example, relative high fuel flow rates (for example up to 1000 US gallons/6,500 lb per minute) can be provided for refueling operations of large aircraft (for example transport aircraft, bombers, etc.), while for fighter aircraft that cannot accept fuel at the maximum flow rate of the refueling device 100, the refueling pressure can be correspondingly reduced. Alternatively, the refueling device 100, in particular the boom member 130, nozzle 135 and lumen 120 can be sized to allow suitable fuel flow rates for refueling a narrow range of receiver aircraft, for example only fighter aircraft or only larger aircraft (for example about 400 US gallons/2,600 lb per minute).

The spatial control system 160 is configured for controlling a spatial disposition of the refueling device 100 when towed aft of the tanker aircraft 12 via the hose 52 and at least while the refueling device 100 is not engaged with the receiver aircraft 20, and enables the refueling device 100 to be steered and/or to adopt any desired stable spatial disposition while being towed at the end 54 of hose 52.

In particular, and referring to FIG. 6(*a*), spatial control system 160 is configured for selectively and controllably providing a non-zero angular disposition, angle θ, between the aft boom axis BAA and the forward direction A, and enables this angle θ to be selectively maintained between the boom axis BAA and the forward direction A at least for a part of the time when the refueling device 100 is being towed by the tanker aircraft 12 via hose 52, at least while the refueling device 100 is not engaged with the receiver aircraft 20, and in particular during the engagement operation of the fuel device 100 to the receiver aircraft 20 and during refueling thereof.

In particular, angle θ is in pitch, i.e., about a pitch axis P of the refueling device 100 and is defined on a plane including the roll axis R and the yaw axis Y of the refueling device 100. Angle θ is thus representative of an angle of attack of the aft boom axis BAA with respect to forward direction A (which is typically, but not exclusively, parallel to the horizontal direction). Nevertheless, and depending on specific conditions during any particular refueling operation, angle θ can include an angular displacement component between the aft boom axis FAA and the forward direction A in yaw (i.e., about yaw axis Y), for example due to sideslip angle, and/or in roll (i.e., about roll axis R), instead of or in addition to an angular displacement component in pitch (i.e., about pitch axis P).

Thus, the spatial control system 160 is also configured for providing stability to the refueling device 100, while tethered to and towed by the tanker aircraft 12 via the hose 52, and at least while the refueling device 100 is not engaged with the receiver aircraft 20, and while the aft boom axis BAA is at any desired pitch and/or yaw and/or roll angle to provide the aforesaid angle θ.

In particular, and referring to FIG. 6(*a*) in particular, angle θ is such as to provide a design angle (angle $\theta_{des}$) that is within a particular angular range which corresponds to the design relative angular position of the boom member 130 (in particular the design relative angular position of the aft boom axis BAA) with respect to the receiver aircraft 20.

In particular, and referring to FIG. 3, design angle $\theta_{des}$ is the design relative angular position of the aft boom axis BAA with respect to the longitudinal axis of the receiver aircraft 20 (the receiver aircraft 20 being at a predetermined spatial orientation relative to the forward direction A (FIG. 5), typically in horizontal forward flight), to enable the boom member 130 to align and engage the nozzle 135 with respect to the fuel receptacle 22 (FIG. 3). Thus, effectively, design angle $\theta_{des}$ can be considered to be the design relative angular position of the aft boom axis BAA with respect to the forward direction A.

Thus, angle θ (which can have an angular component in yaw and/or in pitch and/or in roll) compensates for any off-nominal pitch of the receiver aircraft 20 (for example if the receiver aircraft 20 is traveling along direction A at a non-zero angle of attack) and/or for any off-nominal roll of the receiver aircraft 20 (for example if the receiver aircraft 20 is traveling along direction A at a non-zero roll angle) and/or for any off-nominal yaw of the receiver aircraft 20 (for example if the receiver aircraft 20 is traveling along direction A at a non-zero sideslip angle) to ensure that the actual angular disposition between the aft boom axis BAA and the receiver aircraft longitudinal axis is maintained at design angle $\theta_{des}$ even as the relative spatial orientation between the receiver aircraft 20 and the forward direction changes.

Thus, at the design angle $\theta_{des}$ the aft boom axis BAA is in an engagement enabling orientation with respect to the receiver aircraft 20, and in particular with respect to the fuel receptacle 22.

In non-limiting examples, angle θ (and in particular angle $\theta_{des}$) can be in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°.

In one non-limiting example, angle $\theta_{des}$ can be about 30°, and operation of the refueling device 100 to adopt this angle automatically renders it compatible for use with existing receiver aircraft 20, in which the fuel receptacles 22 are configured for receiving and engaging with a nozzle at the end of a boom where the boom is at about 30° to the longitudinal axis of the receiver aircraft, without the need for modifying the configuration of the fuel receptacle thereof.

Thus, when angle θ is equal to design angle $\theta_{des}$, the receiver aircraft 20 travelling along direction A with zero angle of attack and zero sideslip and zero roll, and aft boom axis BAA is at the required spatial orientation to the forward direction A of the tanker aircraft and the receiver aircraft such as to ensure engagement between the nozzle 135 in the fuel receptacle 22, without the need for modifying the configuration of the fuel receptacle thereof.

Figure 2:
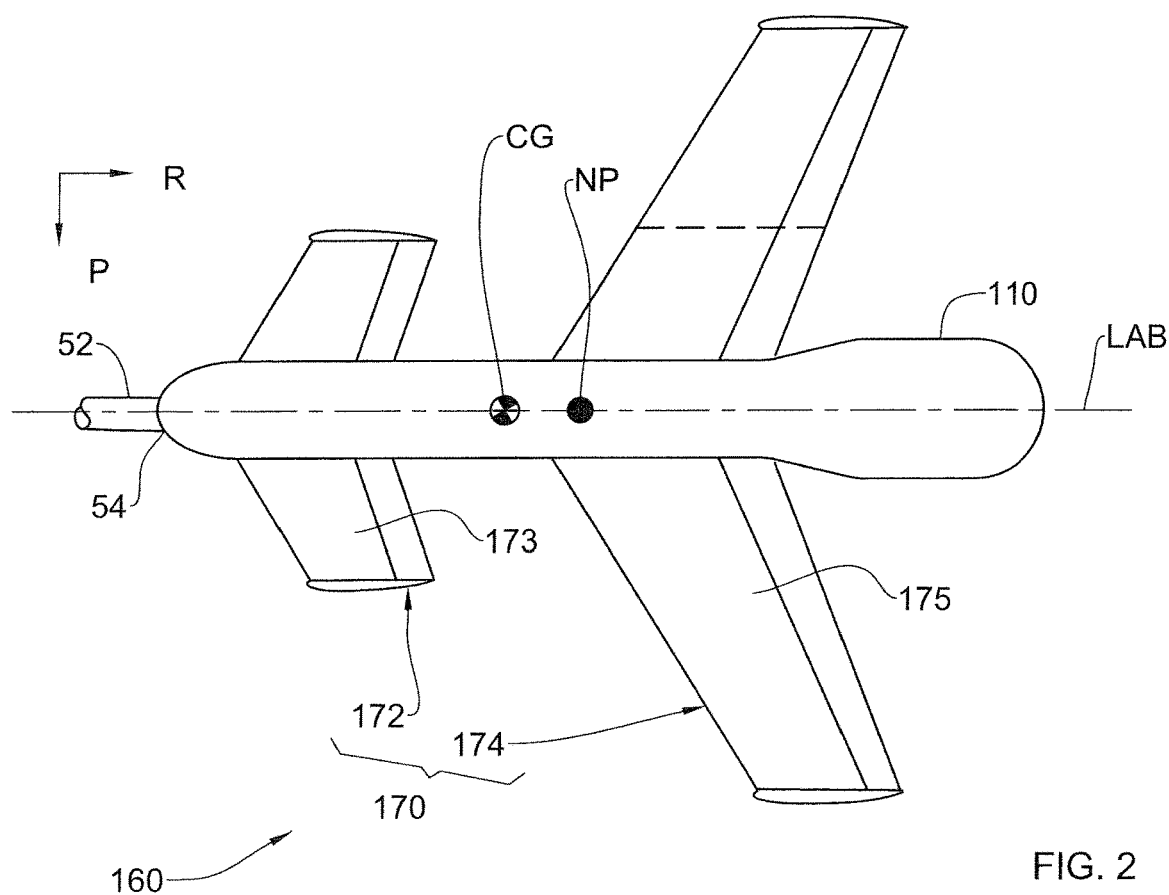
FIG. 2 is a top view of the example of the refueling device of FIG. 1.

In this example, the spatial control system 160 comprises a selectively controllable aerodynamic control system 170, comprising a forward set 172 of aerodynamic control surfaces 173 mounted to body 110 at a forward portion thereof, and an aft set 174 of aerodynamic control surfaces 175 mounted to the body 110 at an aft portion thereof. Referring in particular to FIG. 2, the aft set 174 is thus in aft spaced relationship with respect to the forward set 172, and the center of gravity CG of the body 110 is disposed longitudinally intermediate the aft set 174 and the forward set 172, noting that the actual longitudinal position of the center of gravity CG can shift between two extreme longitudinal positions according to, inter alia, whether the boom member 130 is extended or retracted, and whether fuel is present in the refueling device 100 or absent therefrom.

It is to be noted that at least in this example, the center of gravity CG is forward of the neutral point NP. However, in alternative variations of this example, and in other examples, the center of gravity CG can be aft of the neutral point NP, or, the center of gravity CG can be at the neutral point NP.

In alternative variations of this example and in other examples, the center of gravity can be forward of both the forward set and the aft set of aerodynamic surfaces, which are configured to provide the required stability to the refueling device 100 with the boom axis 131 at any desired pitch and/or yaw and/or roll angle at least while the refueling device 100 is not engaged with the receiver aircraft 20.

The refueling device 100 can optionally further comprises an aerodynamic stabilizer arrangement (not shown), different from the spatial control system 160. For example, the aerodynamic stabilizer arrangement is in the form of a respective drogue structure fixed to the aft portion of the body 110, for example similar to that disclosed in WO 2013/102903 and WO 2013/102906 with respect to FIGS. 17(*a*) and 17(*b*) thereof, mutatis mutandis, in which the drogue structure has an inactive (or stowed) configuration, in which drogue structure generates minimum drag, and an active (or deployed) configuration in drogue structure generates more drag than in the inactive configuration, up to a maximum drag. Such a drogue structure can be utilized for generating a drag (when in the active configuration) which in turn induces a tension to the hose 52, thereby aiding reduction or dampening of vibrations or oscillations in the hose 52 that can otherwise occur.

In at least this example, the spatial control system 160 of refueling device 100, in particular the selectively controllable aerodynamic control system 170, is configured for enabling the device 100 to be steered in one, or two, or three degrees of freedom in translation and in one, or two, or three degrees of freedom in rotation, independently of the tanker aircraft 12 or of the refueling aircraft 20, at least while the refueling device 100 is not engaged with the receiver aircraft 20. Thus, the spatial control system 160, in particular the selectively controllable aerodynamic control system 170, is configured providing:

one or more of: sideslip, up/down translation, forward-aft translation, relative to the tanker aircraft 12 and/or to the refueling aircraft 20, independently of rotational moments in roll pitch and/or yaw; and/or rotational moments in one or more of roll pitch and/or yaw, relative to the tanker aircraft 12 and/or to the refueling aircraft 20, independently of sideslip, up/down translation, forward-aft translation.

The spatial control system 160 is also configured for providing an angle of attack for the body 110 with respect to the forward direction, for example up ±10°.

In at least this example, and referring again to FIG. 6(*a*), at least a part of angle θ, in particular a part of the design angle $\theta_{des}$ is provided first angular disposition η1, i.e., by pivoting the boom member 130 about axis C, depending on the magnitude of the relative angular disposition φ between the longitudinal axis LAB of the body 110 and the forward direction A. This angular disposition φ can be positive, representing a positive angle of attack of body 110 with respect to forward direction A, or can be negative, or can be zero. In at least this example, the spatial control system 160 is configured for providing a zero or near zero said angular disposition φ when the boom member 130 is in its deployed position pivoted such that the aft boom axis BBA is at first angular disposition η1.

Referring again to FIGS. 1 to 4, in at least this example, the forward set 172 of aerodynamic control surfaces 173 is in the form of a H-canard arrangement at a forward part of the body 110, comprising swept back canards 173C, mounted to the forward part of body 110, and comprising vertical fins 173F above and below port and starboard canard wing tips 173T of the canards 173C. While in at least this example, the canards 173C are fixed, and comprise pivotable surfaces to provide control moments to the device 100, in alternative variations of this example the canards can instead can be pivotable. Furthermore, vertical fins 173F, are each pivotable or can instead comprise pivotable surfaces to provide control moments to the refueling device 100.

The aft set 174 of control surfaces 175 is in the form of a H-tail arrangement, comprising swept back wings 176W, mounted to the aft part of body 110, and comprising vertical fins 177F above and below port and starboard wing tips 178T of the wings 176W. while in this example the swept back wings 176W are fixed, and comprise pivotable surfaces to provide control moments to the device 100, in alternative variations of this example the swept back wings 176W can instead can be pivotable. The vertical fins 177F are each pivotable or can instead comprise pivotable surfaces to provide control moments to the refueling device 100.

However, other arrangements are also possible for selectively controllable aerodynamic control system 170 and/or for the body 110.

For example, the forward set 172 of aerodynamic control surfaces 173 and/or the aft set 174 of aerodynamic control surfaces 175 can instead each be configured to have any one or more of the following features, in any combination:

monoplane configuration, including any one of: high wing configuration (or shoulder wing configuration), low wing configuration or mid wing configuration mounted on or near an upper part, a lower (bottom) part of in-between the upper and lower part, respectively, of the body 110; parasol wing configuration mounted to the body 110 via cabane struts of the like; shoulder wing configuration;

biplane, triplane, quadruplane, multiplane configurations, having two, three four, or more than four wing plane elements, respectively, of similar size or dissimilar size with respect to one another, stacked one above the other in unstaggered, or forward staggered, or backwards staggered arrangement;

combined or closed wing configurations, in which two or more wing elements are joined structurally at or near the respective wing tips in some way; for example a box wing configuration, in which at least one set of overlying (staggered or unstaggered) wing elements is joined together between their tips by vertical fins; tandem box wings; rhomboidal wings in which at least one set of overlying wing elements has a forward swept wing plane and a swept back wing plane, joined between the tips directly or via a vertical fins; annular or ring wing, which can be flat (in the form of the rim of a flat disc) or cylindrical (the wing is shaped as a cylinder), for example;

at least one wing element is cantilevered (self-supported) and/or externally supported to the body 110 via struts and/or braces;

wings elements, wherein each can comprise low aspect ratio, moderate aspect ratio or high aspect ratio;

wings elements, wherein each wing element can be swept forward or swept back or have zero sweep, and/or the sweep angle can be fixed or varied along the span, and/or each wing element can have fixed wing geometry or variable wing geometry, for example variable sweep or oblique wing configurations;

wings elements, wherein each wing element can have a respective wing chord that can be fixed or varied along the span of the wing element, for example including at least one of the following plan shapes: elliptical plan; constant chord plan, tapered plan; trapezoidal plan; reverse tapered plan; compound tapered plan;

wings elements, wherein each wing element can be based on a delta design, including at least one of the following: regular delta; cropped delta (wing tip is cropped) compound delta; double delta; ogival delta;

wings elements, wherein each wing element can have dihedral or anhedral angle;

wings elements, wherein the wing elements can be formed as fins, for example in cruciform "X" or cruciform "+" configuration, or having one, two, three, four, or more than four fins arranged on the body 110 in any geometrical arrangement;

wings elements, wherein the wing elements can comprise vertical fins or the like, attached on the upper part and/or the lower part at any spanwise position including the tip; and/or the fins can be swept forward or swept back or have zero sweep, and/or sweep angle can be fixed or varied along the span, and/or each vertical fin can have fixed wing geometry or variable wing geometry, for example variable sweep or oblique wing configurations;

each wing element can be fixed, or can be movably mounted to the body 110 and fully pivotable to operate independently as an integral control surface, or can be fixedly mounted to the body 110 and comprises a pivotal control surface;

each wing element can be movably mounted to the body 110 to allow for selective relative translational movement therebetween.

For example, the forward set 172 of aerodynamic control surfaces 173 can have any other suitable configuration regarding its geometrical and spatial relationship with respect to the aft set 174 of aerodynamic control surfaces 175, for example as follows:

conventional configuration, in which the forward set 172 of aerodynamic control surfaces 173 forms the main lift-generating wing arrangement of the device 100, while the aft set 174 of aerodynamic control surfaces 175, forms part of the stabilizer or tail;

alternative canard configuration, in which the aft set 174 of aerodynamic control surfaces 175 forms the main lift-generating wing arrangement of the device 100, while the forward set 172 of aerodynamic control surfaces 173 can be in the form of canards or fins in cruciform configuration as the stabilizer;

tandem configuration, in which both the aft set 174 of aerodynamic control surfaces 175 and the forward set 172 of aerodynamic control surfaces 173 are configured to provide lift and to provide stability;

tailess configuration, in which the forward set 172 of aerodynamic control surfaces 173 is omitted, and the aft set 174 of aerodynamic control surfaces 175 is configured to provide lift and to provide stability;

three-surface or triplet configuration, in which in which the aft set 174 of aerodynamic control surfaces 175 forms the main lift-generating wing arrangement of the device 100, while the forward set 172 of aerodynamic control surfaces 173 can be in the form of canards or fins forming part of the stabilizer, and further comprising a third set of aerodynamic control surfaces aft of the aft set 174 of aerodynamic control surfaces 175, forms part of the stabilizer.

For example, the forward set 172 of aerodynamic control surfaces 173 and/or the aft set 174 of aerodynamic control surfaces 175 can be blended with the body 100 to provide a blended body configuration.

For example, one of the forward set 172 of aerodynamic control surfaces 173 and/or the aft set 174 of aerodynamic control surfaces 175 can be omitted, and the other one of forward set 172 of aerodynamic control surfaces 173 and/or the aft set 174 of aerodynamic control surfaces 175 can be formed as a flying wing configuration, incorporating therein the functions of body 110, which can then be omitted.

For example, the forward set 172 of aerodynamic control surfaces 173 and/or the aft set 174 of aerodynamic control surfaces 175 can both be omitted, and the body 110 can be formed as a lifting body, integrally providing the functions of the aerodynamic control system 170.

For example, the aerodynamic control system 170 can be replaced with or supplemented by reaction control thrusters.

The refueling device 100 can optionally further comprise a force generating arrangement (not shown), configured for selectively generating a force FB (see FIG. 6(b)) along the aft boom axis BAA in a direction towards nozzle 135 from elbow 131.

For example, the force generating arrangement comprises: (a) at least some elements of the spatial control system 160, in particular the selectively controllable aerodynamic control system 170; and optionally (b) at least some elements of the aerodynamic stabilizer arrangement.

The force generating arrangement can be configured for selectively generating force FB in a direction aligned with the aft boom axis BAA by generating a negative lift force LF (or reducing the lift force by force LF) and a drag force LD, which together provide force FB of the required magnitude and vector. The negative lift force LF can be generated by suitably controlling the spatial control system 160, in particular the selectively controllable aerodynamic control system 170. For example, appropriately changing an angle of attack, and/or providing a flap angle to the respective control surfaces of the control system 170 can reduce the lift generated by the control system 170, and thus result in a net downwards force corresponding to negative lift force LF. Concurrently, in at least some cases, the drag force LD can also be generated by suitably controlling the spatial control system 160, in particular the selectively controllable aerodynamic control system 170. For example, appropriately changing an angle of attack, and/or providing a flap angle to the respective control surfaces of the control system 170 can also change the drag generated by the control system 170, and thus result in an increase in drag corresponding to drag force LD. Additional drag force can be generated, where necessary to complement or replace the drag generated by the control system 170 to provide the appropriate drag force LD, by controlling the drag generated by the aerodynamic stabilizer arrangement.

The force generating arrangement is in particular configured for selectively generating a force FB having a magnitude sufficient for forcing the nozzle 135 into engagement with the fuel receptacle 22 of the receiver aircraft when the nozzle 135 (and the boom member 130) and the fuel receptacle 22 are in a predetermined relative spatial disposition, i.e., when the refueling device 100 reaches an engagement enabling position and the aft boom axis BAA is in the engagement enabling orientation with respect to the receiver aircraft 20, and in particular with respect to the fuel receptacle 22.

The force generating arrangement is further configured for selectively operating in this manner responsive to the nozzle 135 being in a predetermined proximity to the fuel receptacle 22, i.e. responsive to the nozzle 135 being in a predetermined spacing with respect to the fuel receptacle 22, typically the engagement enabling spatial position, and can be operated manually or automatically to provide such a force FB.

Thus, at the engagement enabling position, when the boom member 130, in particular the aft boom axis BBA, is in a predetermined spatial disposition with respect to the fuel receptacle 22 and the nozzle 135 being in a predetermined spacing with respect to the fuel receptacle 22 (i.e., at the engagement enabling position the aft boom axis BBA is at the engagement enabling orientation—corresponding to the design angle $\theta_{des}$), the force generating arrangement can be selectively actuated to compel the boom member 130 to follow a predetermined trajectory (together with the device 100), for example with the aft boom axis BBA aligned in the direction of the receiver aircraft 20, to ensure alignment and engagement between the nozzle 135 and the fuel receptacle 22. In this example, the boom member 130 (in particular the aft boom axis BBA) is maintained at the engagement enabling orientation—corresponding to the design angle $\theta_{des}$, while the body 110 remains at the same spatial disposition with respect to the receiver aircraft 20. The body 110 is moved towards the receiver aircraft 20 along a direction aligned with the aft boom axis BAA, maintaining the aft boom axis BAA at the engagement enabling orientation—corresponding to the design angle $\theta_{des}$, to effect engagement between the nozzle 135 and the fuel receptacle 22. In alternative variations of this example, the boom 130 is telescopic, or at least the aft boom portion 138 is telescopic, and is partially or fully telescopically extended towards the receiver aircraft 20 while the device 100 can be moved towards or away from the receiver aircraft 20 to effect engagement between the nozzle 135 and the fuel receptacle 22.

Once the nozzle 135 is forced into engagement with the fuel receptacle 22 of the receiver aircraft 20, the tanker aircraft 12 can begin refueling the receiver aircraft 20.

Referring to FIG. 6, in at least this example the device 100 further comprises controller 185 for controlling operation of one or more of: the force generating arrangement, the spatial control system 160 (in particular the selectively controllable aerodynamic control system 170), the aerodynamic stabilizer arrangement. For example, the controller 185 comprises any suitable computer control system, and can be internally or externally mounted in the refueling device 100. In alternative variations of this example and in other examples, the controller 185 or portions thereof can instead comprise any suitable electronic control unit, or any other suitable control unit, and/or the controller 185 or portions thereof can be comprised elsewhere in the in-flight refueling system 50 or in the tanker aircraft 12.

Referring to FIG. 6, in at least this example the refueling device 100 further comprises a suitable spatial data acquisition system 189, for providing or enabling the calculation of spatial data relating to the relative spatial dispositions between the refueling device 100 and the receiver aircraft 20, in particular the relative spatial dispositions between the fuel delivery nozzle 135 of the refueling device 100 and the fuel receptacle of the receiver aircraft, to enable selectively controlling the refueling device to provide automatic (optionally including autonomous) and/or manual steering of the refueling device 100 to the engagement enabling position and subsequent selective engagement of the fuel delivery nozzle to the fuel receptacle of the receiver aircraft 20.

For example, the data acquisition system is in the form of imaging system, in particular configured for providing imaging data of any object coming within a field of regard (FOR) aft of the refueling device 100. In alternative variations of this example, the imaging system can be replaced with any other suitable data acquisition system for providing the aforesaid spatial data.

In yet other alternative variations of this example and in other examples, the refueling device 100 can omit the spatial data acquisition system 189 and can be actively controlled by an operator, for example, to control the relative spatial position and orientation of the refueling device 100 with respect to the receiver aircraft 20, in particular the spatial position and orientation of the boom member 130, in particular the aft boom portion 138 and/or nozzle 135 with respect to the fuel receptacle 22, so that the nozzle 135 can be selectively and controllably brought into selective engagement with the fuel receptacle 22 in a safe and effective manner, for example via direct visual tracking of the device by one or more operators. For example, such an operator can be in the tanker aircraft 12, and/or such an operator can be in the refueling aircraft 20, and/or such an operator can be in another flying platform, for example a chase aircraft independent of the refueling aircraft 20.

Alternatively, in yet other alternative variations of this example, the refueling device 100 can be operated as a free flying refueling device towed at the end of hose 52, and the relative spatial position and orientation of the refueling device 100 with respect to the receiver aircraft 20 (in particular the position and orientation of the boom member 130 and nozzle 135 with respect to the fuel receptacle 22, so that the nozzle can be controllably brought into selective engagement with the fuel receptacle 22 in a safe and effective manner) is achieved by maneuvering the receiver aircraft 20 only. In such a case, the spatial control system 160 can optionally comprise a non-adjustable aerodynamic stability system that is configured for allowing the refueling device 100 to adopt a particular, pre-set, desired angle $\theta$ while maintaining a zero pitching moment (and/or zero yawing moment and/or zero rolling moment), this being the design angle $\theta_{des}$ as discussed above for example.

Optionally, a suitable air-driven generator 187 can be provided in the refueling device 100 to provide electrical power thereto. Additionally or alternatively, electrical power can be provided to the refueling device 100 by the tanker aircraft 12. Additionally or alternatively, electrical power can be provided to the refueling device 100 by one or more batteries in the refueling device 100. Additionally or alternatively, electrical power can be provided to the refueling device 100 by one or more ram air turbines (RAT), affixed internally or externally with respect to the refueling device 100.

Figure 7:
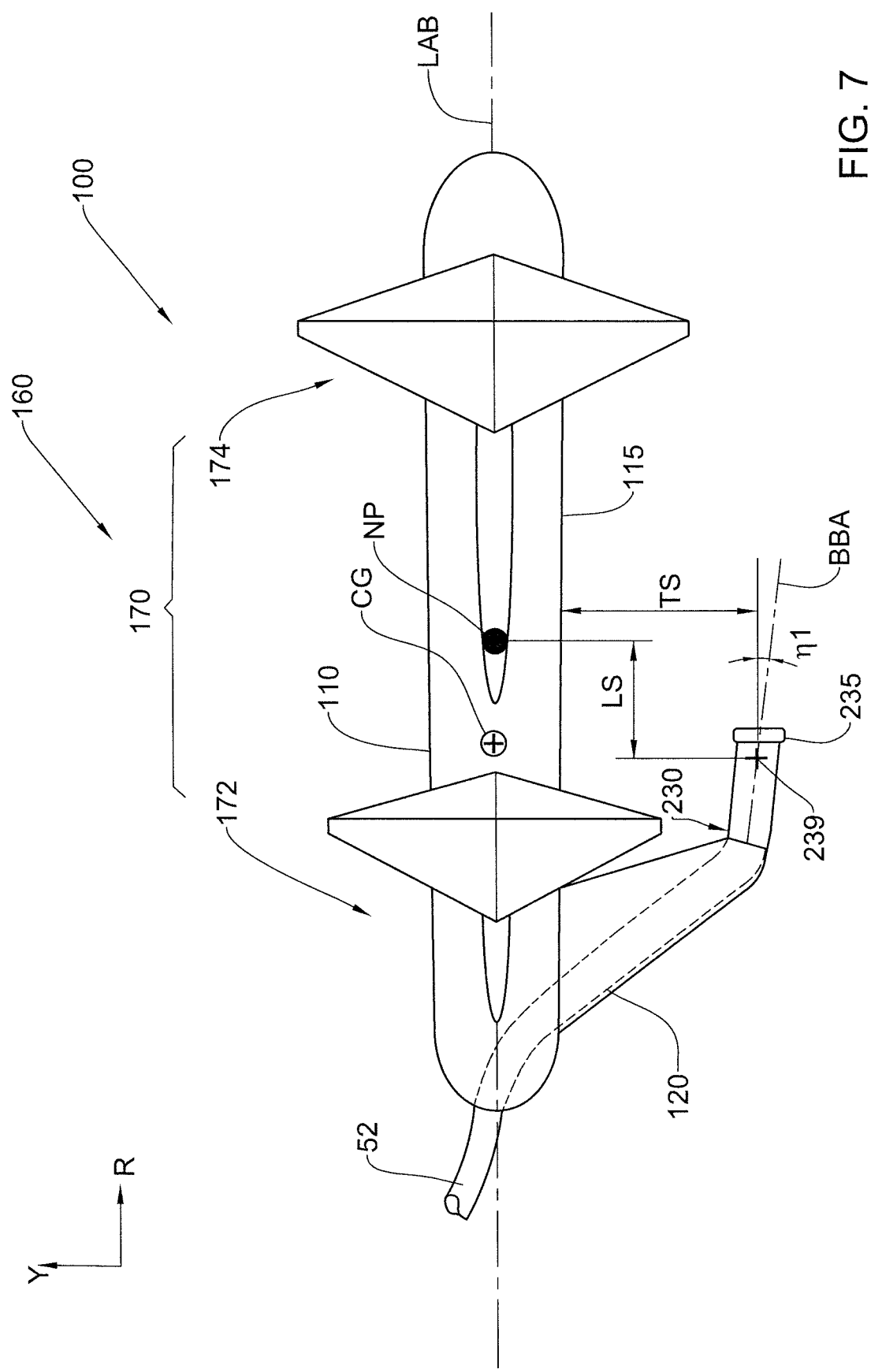
FIG. 7 is a side view of an alternative variation of the example of refueling device of FIG. 1.

In an alternative variation of the example of FIGS. 1 to 6, and referring to FIG. 7, the boom member, generally designated with reference numeral 230, is configured for being fixedly (i.e., non-pivotably) mounted to the body 110 of the device 100.

In the example of FIG. 7, the boom member 230 includes an aft boom portion 238 having an aft boom axis BAA', fuel delivery nozzle 235 and nozzle rotation center 239, similar to the aft boom portion 138, aft boom axis BAA, fuel delivery nozzle 135 and nozzle rotation center 139, respectively, as disclosed herein for the example of FIGS. 1 to 6, mutatis mutandis.

In the example of FIG. 7, the body lumen 120 extends up to and connects to the aft boom portion 238, for example via a vane member 118 that extends downwardly from the body 110 to thereby provide the required or desired transverse spacing TS between the fuel delivery nozzle 235 and the body 110. The vane member 118 can thus be considered to be a forward boom member portion of the boom member 230, that is fixedly connected to the body 110.

As with the example of FIGS. 1 to 6, mutatis mutandis, the fuel delivery nozzle 235 of the example of FIG. 7, in particular the nozzle rotation center 239 thereof, is located forward of the neutral point NP of the device 100 by a spacing LS.

Also as with the example of FIGS. 1 to 6, mutatis mutandis, the aft boom axis BAA' of the example of FIG. 7 is at an angular displacement with respect to the longitudinal axis LAB of the body 110 of $\eta 1$, which is fixed regardless of whether the device 100 is engaged in in-flight refueling operation or not.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims

The invention claimed is:

1. A refueling device for use in in-flight refueling operation, comprising:
 (a) a body configured for being towed by a tanker aircraft in a forward direction via a fuel hose at least during in-flight refueling operation, the body having a body longitudinal axis and a neutral point;
 (b) a boom member carried by the body, the boom member having a fuel delivery nozzle, the fuel delivery nozzle being configured for selectively engaging with a fuel receptacle in a receiver aircraft to enable fuel to be transferred from said fuel hose to the receiver aircraft during said in-flight refueling operation;
 (c) spatial control system configured for selectively providing stability and control to the refueling device;
 (d) wherein at least during refueling operation the fuel delivery nozzle is longitudinally forward of the neutral point.

2. The refueling device according to claim 1, the boom member comprising a forward boom member portion having a forward boom axis, and an aft boom member portion having an aft boom axis.

3. The refueling device according to claim 2, including one of the following:
 wherein the boom member is mounted to the body via the forward boom member portion, and wherein the fuel delivery nozzle is located on said aft boom member;
 wherein the boom member is pivotably mounted to the body via the forward boom member portion;
 wherein said boom member is pivotably mounted with respect to the body;
 wherein said boom member is pivotably mounted with respect to the body, and, wherein said boom member is pivotable with respect to the body between a retracted position and a deployed position;
 wherein said boom member is pivotably mounted with respect to the body, and, wherein said boom member is pivotable with respect to the body between a retracted position and a deployed position, and, wherein in said deployed position the fuel delivery nozzle is configured to enable in-flight refueling;
 wherein said boom member is pivotably mounted with respect to the body, and, wherein said boom member is pivotable with respect to the body between a retracted position and a deployed position, and, wherein in said deployed position the fuel delivery nozzle is at a transverse spacing with respect to the body to enable in-flight refueling; or
 wherein said boom member is pivotably mounted with respect to the body, and, wherein said boom member is pivotable with respect to the body between a retracted position and a deployed position, and, wherein in said retracted position the fuel delivery nozzle is located closer with respect to the body than in the deployed position.

4. The refueling device according to claim 2, wherein said forward boom member portion is connected to said aft boom member portion via a boom elbow.

5. The refueling device according to claim 2, including one of the following:
 wherein the forward boom axis and the aft boom axis are in non-parallel spatial relationship; or
 wherein the forward boom axis and the aft boom axis are in a fixed non-parallel spatial relationship irrespective of whether the boom member is in the retracted position or the deployed position.

6. The refueling device according to claim 2, including one of the following:
 wherein the forward boom axis is angularly displaced with respect to the aft boom axis by a first angular disposition;
 wherein the forward boom axis is angularly displaced with respect to the aft boom axis by a first angular disposition, and, wherein said first angular disposition is between 60° and 120°.

7. The refueling device according to claim 2, wherein at least during said in-flight refueling operation, said aft boom axis is at a second angular disposition with respect to said body longitudinal axis, said second angular disposition being non-zero.

8. The refueling device according to claim 2, wherein the boom member is pivotably mounted with respect to the body, and wherein said boom member pivots as a rigid body.

9. The refueling device according to claim 2, including one of the following:
 wherein the boom member is fixedly mounted to the body via the forward boom member portion;
 wherein the boom member is fixedly mounted to the body via the forward boom member portion, and, wherein the forward boom member portion is in the form of a fin.

10. The refueling device according to claim 2, including one of the following:
 wherein at least during said in-flight refueling operation, said aft boom axis is at a third angular disposition with respect to a forward direction of said refueling device;
 wherein at least during said in-flight refueling operation, said aft boom axis is at a third angular disposition with respect to a forward direction of said refueling device, and, wherein said third angular disposition is such as to ensure that the aft boom axis is at a predetermined design angle with respect to the receiver aircraft;
 wherein at least during said in-flight refueling operation, said aft boom axis is at a third angular disposition with respect to a forward direction of said refueling device, and, wherein said third angular disposition is such as to ensure that the aft boom axis is at a predetermined design angle with respect to the receiver aircraft, and, wherein said design angle is about 30°; or
 wherein at least during said in-flight refueling operation, said aft boom axis is at a third angular disposition with respect to a forward direction of said refueling device, and, wherein said refueling device is configured for maintaining said third angular disposition between said aft boom axis and said forward direction at least prior to engagement of said fuel delivery nozzle with a fuel receptacle of a receiver aircraft that is flying in formation aft of the tanker aircraft.

11. The refueling device according to claim 1, including one of the following:
 wherein said spatial control system is further configured for selectively providing control moments in at least one of pitch, yaw and roll wherein to enable the refueling device to be flown while towed by the tanker aircraft in said forward direction via said fuel hose;

wherein said spatial control system comprises selectively controllable aerodynamic control system;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said forward set of aerodynamic control surfaces comprises a canard configuration, and said aft set of aerodynamic control surfaces comprises one or more wing elements;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said aft set of aerodynamic control surfaces comprises an H-wing configuration, comprising two vertical wing stabilizers, one each on either side of a respective wing;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said forward set of aerodynamic control surfaces comprises an H-canard configuration, comprising two vertical canard stabilizers, one each on either side of a respective canard; or wherein said spatial control system is configured for enabling the refueling device to be steered in one, or two, or three degrees of freedom in translation, and in one, or two, or three degrees of freedom in rotation, independently of the tanker aircraft or of the refueling aircraft.

12. The refueling device according to claim 1, including one of the following:
   wherein the refueling device further comprises an aerodynamic stabilizer arrangement, different from the spatial control system; or
   wherein the refueling device further comprises an aerodynamic stabilizer arrangement, different from the spatial control system, and, wherein said aerodynamic stabilizer arrangement is in the form of a drogue structure having a stowed configuration, in which drogue structure generates a minimum drag, and a deployed configuration in drogue structure generates greater drag than in the inactive configuration.

13. The refueling device according to claim 1, including one of the following:
   wherein the refueling device further comprises a force generating arrangement configured for selectively generating a force along said aft boom axis in a direction towards said fuel delivery nozzle; or
   wherein the refueling device further comprises a force generating arrangement configured for selectively generating a force along said aft boom axis in a direction towards said fuel delivery nozzle, and, wherein said force generating arrangement is configured for selectively generating said force along said aft boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle.

14. The refueling device according to claim 1, including at least one of the following:
   said body comprising a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication;
   said refueling device further comprising a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft; or
   said refueling device further comprising a suitable controller for controlling operation thereof.

15. The refueling device according to claim 1, wherein the fuel delivery nozzle is rotatably mounted to a free end of the boom member via a nozzle rotation center of the fuel delivery nozzle, and wherein at least during refueling operation the nozzle rotation center is longitudinally forward of the neutral point.

16. A refueling system comprising a refueling fuel reservoir connected to a refueling device via a hose, the refueling device being as defined in claim 1.

17. A tanker aircraft comprising at least one refueling system as defined in claim 16.

18. A refueling device for use in in-flight refueling operation between a tanker aircraft and a receiver aircraft, comprising:
   a selectively steerable body configured for being towed by a tanker aircraft via a fuel hose at least during in-flight refueling, and comprising a boom member having an aft boom axis and a fuel delivery nozzle, said boom member configured to enable fuel to be transferred from said fuel hose to a receiver aircraft along said aft boom axis during said in-flight refueling operation;
   wherein at least during said in-flight refueling operation the fuel delivery nozzle is longitudinally forward of a neutral point of the refueling device.

19. The refueling device according to claim 18, wherein the fuel delivery nozzle is rotatably mounted to a free end of the boom member via a nozzle rotation center of the fuel delivery nozzle, and wherein at least during refueling operation the nozzle rotation center is longitudinally forward of the neutral point.

20. A boom member for a refueling device for use with a body having a neutral point, the body being configured for being towed by a tanker aircraft in a forward direction via a fuel hose at least during in-flight refueling operation, the boom member comprising a forward boom member portion having a forward boom axis, and an aft boom member portion having an aft boom axis, the forward boom member portion being connected to the aft boom member portion via a boom elbow portion wherein the forward boom axis is angularly displaced with respect to the aft boom axis by a non-parallel angular disposition;
- wherein the boom member is configured for being pivotable about a pivot axis within a range of pivot angles corresponding to at least between a boom retracted position and a boom deployed position;
- wherein the non-parallel angular disposition is conserved for all said pivot angles about the pivot axis, at least within said range of pivot angles between the boom retracted position and the boom deployed position;
- wherein the boom member has a fuel delivery nozzle, and wherein at least during the in-flight refueling operation the fuel delivery nozzle is longitudinally forward of the neutral point.

\* \* \* \* \*